US012623242B2

(12) United States Patent
Okaguchi

(10) Patent No.: US 12,623,242 B2
(45) Date of Patent: May 12, 2026

(54) MIXED-FLUID DELIVERY DEVICE

(71) Applicant: Murata Manufacturing Co., Ltd., Kyoto (JP)

(72) Inventor: Kenjiro Okaguchi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 308 days.

(21) Appl. No.: 18/465,246

(22) Filed: Sep. 12, 2023

(65) Prior Publication Data

US 2024/0042474 A1 Feb. 8, 2024

Related U.S. Application Data

(63) Continuation of application No. PCT/JP2022/008863, filed on Mar. 2, 2022.

(30) Foreign Application Priority Data

Mar. 29, 2021 (JP) ................................ 2021-055218

(51) Int. Cl.
*B05B 14/00* (2018.01)
*B01F 23/213* (2022.01)
(Continued)

(52) U.S. Cl.
CPC .......... *B05B 14/00* (2018.02); *B01F 23/2133* (2022.01); *B05B 7/2491* (2013.01); *B05B 17/0646* (2013.01)

(58) Field of Classification Search
CPC .................. B05B 14/00; B05B 7/2491; B05B 17/0646; B05B 17/04; B05B 17/0623;
(Continued)

(56) References Cited

U.S. PATENT DOCUMENTS 3,387,607 A * 6/1968 Gauthier ........... A61M 15/0085
261/DIG. 65
7,665,460 B2 * 2/2010 Lindsay ............... A61M 11/065
128/200.14
(Continued)

FOREIGN PATENT DOCUMENTS

JP S59-230660 A 12/1984
JP S60-148070 U 10/1985
(Continued)

OTHER PUBLICATIONS

International Search Report for PCT/JP2022/008863 dated Apr. 12, 2022.

*Primary Examiner* — Joseph A Greenlund
(74) *Attorney, Agent, or Firm* — McDonald Hopkins LLC

(57) ABSTRACT

A mixed-fluid delivery device includes a piezoelectric pump that includes a piezoelectric vibrator having a piezoelectric element and a vibrating plate and a pump cabinet and discharges a fluid, and a case body including a pump housing chamber, a liquid reservoir portion, a mixing portion that generates a mixed fluid, a nozzle portion through which the gas discharged from the piezoelectric pump is ejected to the mixing portion, and a conducting portion that conducts a liquid toward the mixing portion. The case body has a reflux path through which a residual liquid that remains in the mixing portion without being delivered to the outside is returned to the liquid reservoir portion. The reflux path is provided so as to be in contact with at least a portion of the pump cabinet.

10 Claims, 8 Drawing Sheets

(51) Int. Cl.
*B05B 7/24* (2006.01)
*B05B 17/00* (2006.01)

(58) Field of Classification Search
CPC .............. B05B 17/0012; B05B 1/3093; B05B 15/58; B01F 23/2133; A61M 15/005; A61M 15/0085
See application file for complete search history.

(56) References Cited

U.S. PATENT DOCUMENTS

| | | | | |
|---|---|---|---|---|
| 7,721,729 | B2 * | 5/2010 | Von Hollen | A61M 11/005 128/200.14 |
| 2006/0243274 | A1 * | 11/2006 | Lieberman | A61M 11/005 128/200.14 |
| 2008/0245362 | A1 * | 10/2008 | Moessis | A61M 11/002 239/338 |
| 2014/0263740 | A1 * | 9/2014 | Esaki | B05B 7/064 239/302 |
| 2018/0257095 | A1 * | 9/2018 | Chang | A61L 9/03 |
| 2019/0366016 | A1 * | 12/2019 | Leonard | A61M 11/04 |
| 2021/0276033 | A1 * | 9/2021 | Ikeda | B05B 7/241 |
| 2021/0404460 | A1 * | 12/2021 | Ikeda | F04F 5/24 |
| 2022/0056900 | A1 * | 2/2022 | Okaguchi | F04B 39/121 |
| 2022/0347400 | A1 * | 11/2022 | Hutchins, IV | A61M 35/30 |
| 2022/0371041 | A1 * | 11/2022 | Goto | B08B 3/02 |
| 2024/0042474 | A1 * | 2/2024 | Okaguchi | A61M 11/005 |

FOREIGN PATENT DOCUMENTS

| | | | |
|---|---|---|---|
| JP | 2013-132471 | A | 7/2013 |
| WO | 2020/111189 | A1 | 6/2020 |
| WO | 2020/203099 | A1 | 10/2020 |

* cited by examiner

MIXED-FLUID DELIVERY DEVICE

CROSS REFERENCE TO RELATED APPLICATION

This is a continuation of International Application No. PCT/JP2022/008863 filed on Mar. 2, 2022 which claims priority from Japanese Patent Application No. 2021-055218 filed on Mar. 29, 2021. The contents of these applications are incorporated herein by reference in their entireties.

BACKGROUND OF THE DISCLOSURE

Field of the Disclosure

The present disclosure relates to a mixed-fluid delivery device.

Description of the Related Art

Conventionally, Japanese Unexamined Patent Application Publication No. 2013-132471 (Patent Document 1) discloses, as a mixed-fluid delivery device, a nebulizer that ejects compressed air through a nozzle hole while adding a liquid to the compressed air in the outlet region of the nozzle hole, atomizes the liquid, and delivers the atomized liquid to the outside.

Patent Document 1: Japanese Unexamined Patent Application Publication No. 2013-132471

BRIEF SUMMARY OF THE DISCLOSURE

When a piezoelectric pump is used as a device for generating compressed air, the temperature of the piezoelectric pump rises due to the heat generation of the piezoelectric element that vibrates a vibrating plate. When the temperature of the piezoelectric pump becomes high, there is a concern the piezoelectric pump and therefore the mixed-fluid delivery device do not operate normally.

The present disclosure addresses the problem described above with a possible benefit of providing a mixed-fluid delivery device that can cool the piezoelectric pump housed in a pump housing chamber provided in a case body.

A mixed-fluid delivery device according to the present disclosure generates a mixed fluid by mixing an ejected gas with a liquid and delivers the mixed fluid to the outside. The mixed-fluid delivery device includes: a piezoelectric pump that includes a piezoelectric vibrator including a piezoelectric element and a vibrating plate, and a pump cabinet having the piezoelectric vibrator therein, the piezoelectric pump discharging a gas; and a case body including a pump housing chamber that houses the piezoelectric pump, a liquid reservoir portion that stores a liquid, a mixing portion that generates a mixed fluid, a nozzle portion through which the gas discharged from the piezoelectric pump is ejected to the mixing portion, and a conducting portion that conducts the liquid toward the mixing portion. The case body has a reflux path through which a residual liquid that remains in the mixing portion without being delivered to the outside is returned to the liquid reservoir portion. The reflux path is provided so as to be in contact with at least a part of the pump cabinet.

In the mixed-fluid delivery device according to the present disclosure, the pump cabinet may have a first main surface and a second main surface that face a main surface of the piezoelectric element. In this case, a part of the reflux path is preferably in contact with at least one of the first main surface and the second main surface.

In the mixed-fluid delivery device according to the present disclosure, the pump cabinet includes a side surface that connects the first main surface and the second main surface to each other. In this case, the nozzle portion is disposed on the side surface.

In the mixed-fluid delivery device according to the present disclosure, the case body may have, around the nozzle portion, a liquid receiving portion that receives the residual liquid. In this case, the reflux path is provided to connect the liquid receiving portion and the liquid reservoir portion to each other.

The mixed-fluid delivery device according to the present disclosure further includes a flow path forming body that is fixed to the case body and forms a flow path through which the mixed fluid flows. In this case, the case body may include a wall portion that constitutes a part of the reflux path and forms an outer surface of the case body, and the flow path forming body may form at least a part of the wall portion and a part of the flow path.

According to the present disclosure, it is possible to provide a mixed-fluid delivery device that can cool a piezoelectric pump housed in a pump housing chamber provided in a case body.

DETAILED DESCRIPTION OF THE DISCLOSURE

Figure 1:
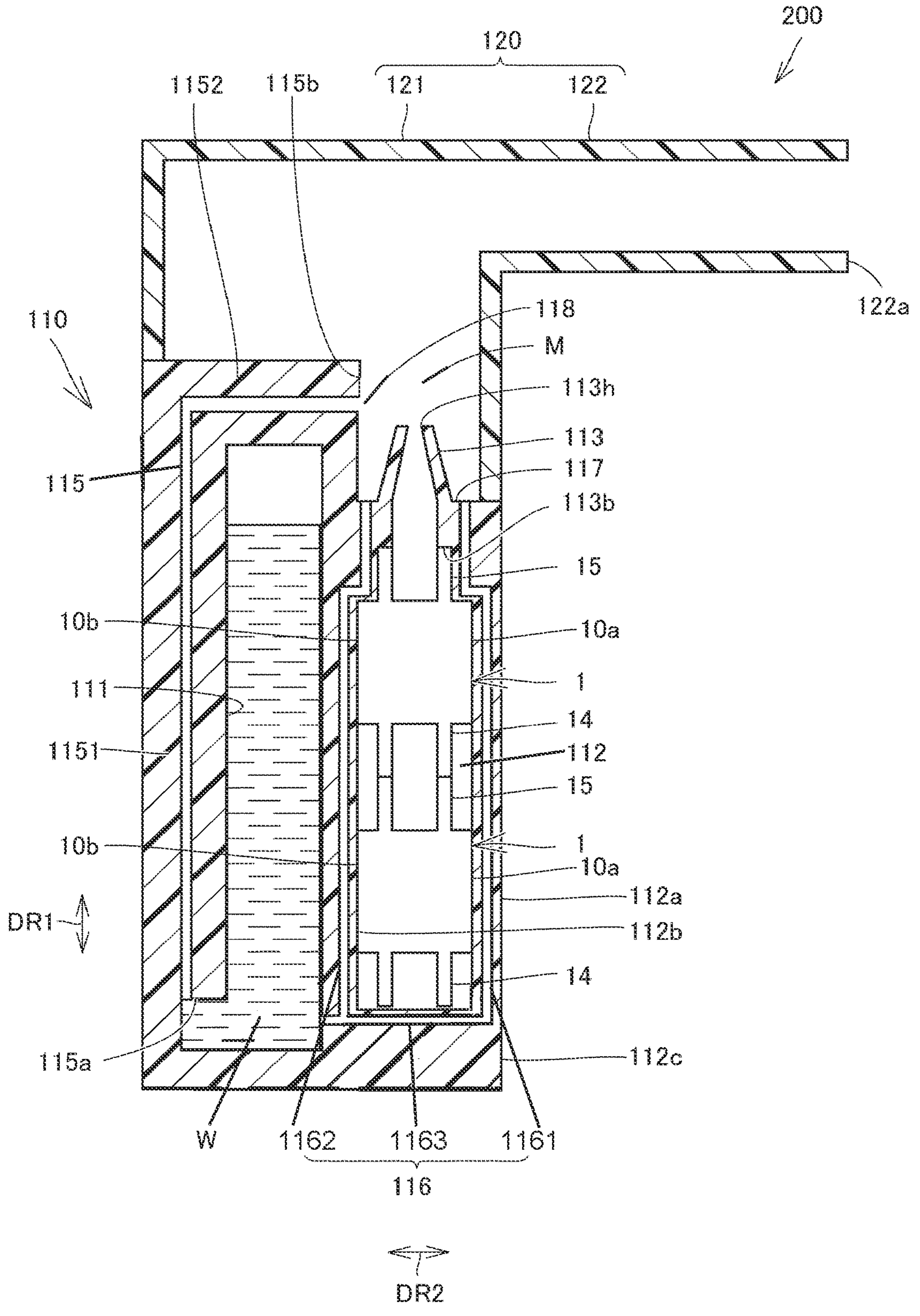
FIG. 1 is a schematic sectional view of a nebulizer according to embodiment 1.

Embodiments of the present disclosure will be described in detail below with reference to the drawings. It should be noted that, in the embodiments illustrated below, the same or common components are denoted by the same reference numerals in the drawings, and the description thereof is not repeated.

Embodiment 1

[Nebulizer]

FIG. 1 is a schematic sectional view of a nebulizer according to embodiment 1. A nebulizer 200 according to embodiment 1 will be described with reference to FIG. 1.

As illustrated in FIG. 1, the nebulizer 200 according to embodiment 1 is a device that generates a mixed fluid in which an atomized liquid is mixed with a liquid by adding the liquid to the ejected gas and delivers the mixed fluid to the outside. It should be noted that the scenario in which the liquid is not vaporized is described as an example in the embodiment, but the liquid may be a vaporized liquid. The nebulizer 200 includes a case body 110 and a flow path forming body 120.

The case body 110 is provided to extend in a first direction (DR1 direction). It should be noted that the first direction is parallel to the axial direction of the nozzle portion 113, which will be described later, and is parallel to, for example, the vertical direction.

The case body 110 includes a liquid reservoir portion 111, a pump housing chamber 112, a nozzle portion 113, a mixing portion M, a conducting portion 118, a conducting path 115, and a reflux path 116.

The liquid reservoir portion 111 and the pump housing chamber 112 are partitioned from each other by a second wall portion 112*b*, which will be described later, and are arranged, for example, in a second direction (DR2 direction) orthogonal to the first direction. It should be noted that the second direction is orthogonal to the axial direction of the nozzle portion 113, that is, parallel to, for example, the left-right direction.

The liquid reservoir portion 111 is provided to extend in the first direction. The liquid reservoir portion 111 temporarily stores a liquid W, such as water, brine, a medicine for curing a bronchial infection, or a vaccine.

The nozzle portion 113 is disposed on one side (upper side) in the first direction as viewed from the pump housing chamber 112. The nozzle portion 113 has a nozzle hole 113*h* at a tip thereof. The nozzle portion 113 has a tapered shape that tapers toward the tip. A base end 113*b* of the nozzle portion 113 is connected to a downstream nozzle portion 15 of a piezoelectric pump 1, which will be described later. The nozzle portion 113 ejects, through the nozzle hole 113*h*, the air delivered from the piezoelectric pump 1.

A nozzle portion 113 part close to the base end 113*b* has a liquid receiving portion 117 that receives a liquid. The liquid receiving portion 117 is provided to surround the nozzle portion 113. The liquid receiving portion 117 stores the liquid that remains in the mixing portion M, which will be described later, and that is not added to the gas.

The mixing portion M mixes the gas ejected through the nozzle portion 113 with the liquid conducted from the conducting portion 118. This atomizes the liquid and generates a mixed fluid in which the atomized liquid is mixed with the gas. The mixing portion M is located in the outlet region of the nozzle hole 113*h*. More specifically, the mixing portion M is located on the downstream side of the nozzle portion 113 in the direction in which the gas is ejected through the nozzle portion 113.

The conducting portion 118 conducts the liquid W toward the mixing portion M. The conducting portion 118 is provided to face the mixing portion M. Specifically, the conducting portion 118 is provided on one side in the second direction as viewed from the mixing portion M.

The conducting portion 118 includes the conducting path 115. The conducting path 115 is provided to extend from the liquid reservoir portion 111 toward the mixing portion M. Specifically, the conducting path 115 is formed in a substantially L shape and includes a first portion 1151 extending in the first direction and a second portion 1152 extending in the second direction.

The end portion of the first portion 1151 located on the other side (lower side) in the first direction constitutes one end 115*a* of the conducting path 115 and is connected to the liquid reservoir portion 111. The end of the second portion 1152 constitutes another end 115*b* of the conducting path 115. The liquid W is conducted to the mixing portion M from the end of the second portion 1152.

The pump housing chamber 112 is formed by the wall portions of the case body 110. The wall portions include a first wall portion 112*a*, a second wall portion 112*b*, and a bottom wall portion 112*c*. In the embodiment, the first wall portion 112*a* and the second wall portion 112*b* are arranged in the second direction. The first wall portion 112*a* faces a first main surface 10*a* of the piezoelectric pump 1, which will be described later, and the second wall portion 112*b* faces a second main surface 10*b* of the piezoelectric pump 1, which will be described later. The bottom wall portion 112*c* constitutes the bottom portion of the case body 110. The bottom wall portion 112*c* connects the end portions (lower end portions) on the other side in the first direction of the first wall portion 112*a* and the second wall portion 112*b* to each other.

Two piezoelectric pumps 1 are housed in the pump housing chamber 112. It should be noted that the number of the piezoelectric pumps 1 housed in the pump housing chamber 112 is not limited to two and may be one or three or more. The case body 110 has an intake port (not illustrated) through which outside air is sucked into the pump housing chamber 112. The intake port is connected to an upstream nozzle portion 14, which will be described later, of the piezoelectric pump 1 disposed on the upstream side via an intake path (not illustrated).

The two piezoelectric pumps 1 are disposed in series in the first direction. Each of the two piezoelectric pumps 1 includes the pump cabinet 10 as described later. The pump cabinet 10 has the first main surface 10*a* and the second main surface 10*b* facing each other, and the upstream nozzle portion 14 and the downstream nozzle portion 15, as described later.

Each of the two piezoelectric pumps 1 is disposed in the pump housing chamber 112 such that the first main surface 10*a* and the second main surface 10*b* of the pump cabinet 10 are in contact with the first wall portion 112*a* and the second wall portion 112*b*, respectively. In this case, the first main surface 10*a* and the second main surface 10*b* face each other in a direction orthogonal to the axial direction of the nozzle portion 113.

A tubular member (not illustrated), such as a tube, connects the upstream nozzle portion 14 of the piezoelectric pump 1 located on the downstream side among the two piezoelectric pumps 1 to the downstream nozzle portion 15 of the piezoelectric pump 1 located on the upstream side among the two piezoelectric pumps 1. It should be noted that the tubular member may also connect the downstream nozzle portion 15 of the piezoelectric pump 1 located on the downstream side among the two piezoelectric pumps 1 to the base end 113*b* of the nozzle portion 113.

The residual liquid that has been conducted from the conducting portion 118 to the mixing portion M but remains in the mixing portion M without being delivered to the outside is returned to the liquid reservoir portion 111 through the reflux path 116. It should be noted that the residual liquid includes the liquid that has not been added to the gas ejected through the nozzle portion 113 in the mixing portion M, and the liquid that has been added to the gas but liquefied by the collision with the inner wall of the flow path forming body 120. The reflux path 116 is provided to connect the liquid receiving portion 117 and the liquid reservoir portion 111 to each other. The reflux path 116 is provided so as to be in contact with at least a part of the pump cabinet 10.

Specifically, the reflux path 116 includes a first flow path 1161, a second flow path 1162, and a third flow path 1163.

The first flow path 1161 is formed by providing a flow path hole in the first wall portion 112*a*, and the first flow path 1161 is in contact with the first main surface 10*a* of the pump cabinet 10.

The second flow path 1162 is formed by providing a flow path hole in the second wall portion 112*b*, and the second flow path 1162 is in contact with the second main surface 10*b* of the pump cabinet 10.

The third flow path 1163 is formed by providing a flow path hole in the bottom wall portion 112*c*, and the third flow path 1163 forms a confluence flow path that joins the first flow path 1161 and the second flow path 1162 to each other and is connected to the liquid reservoir portion 111.

The flow path forming body 120 is detachably attached to the end portion side (upper end side) of the case body 110 located on one side in the first direction. The flow path forming body 120 forms a flow path through which the mixed fluid generated in the mixing portion M flows. The flow path forming body 120 includes a cap portion 121 and a guide portion 122.

The cap portion 121 is provided to cover the end portion (upper end) of one side in the first direction of the case body 110 and covers the mixing portion M. The guide portion 122 is provided so as to be continuous with the cap portion 121. The guide portion 122 guides the gas ejected through the nozzle hole 113*h* toward the user's mouth or nose. A discharge port 122*a* is provided at the tip of the guide portion 122. It should be noted that a mouthpiece may be attached to the end of the guide portion 122.

Figure 2:
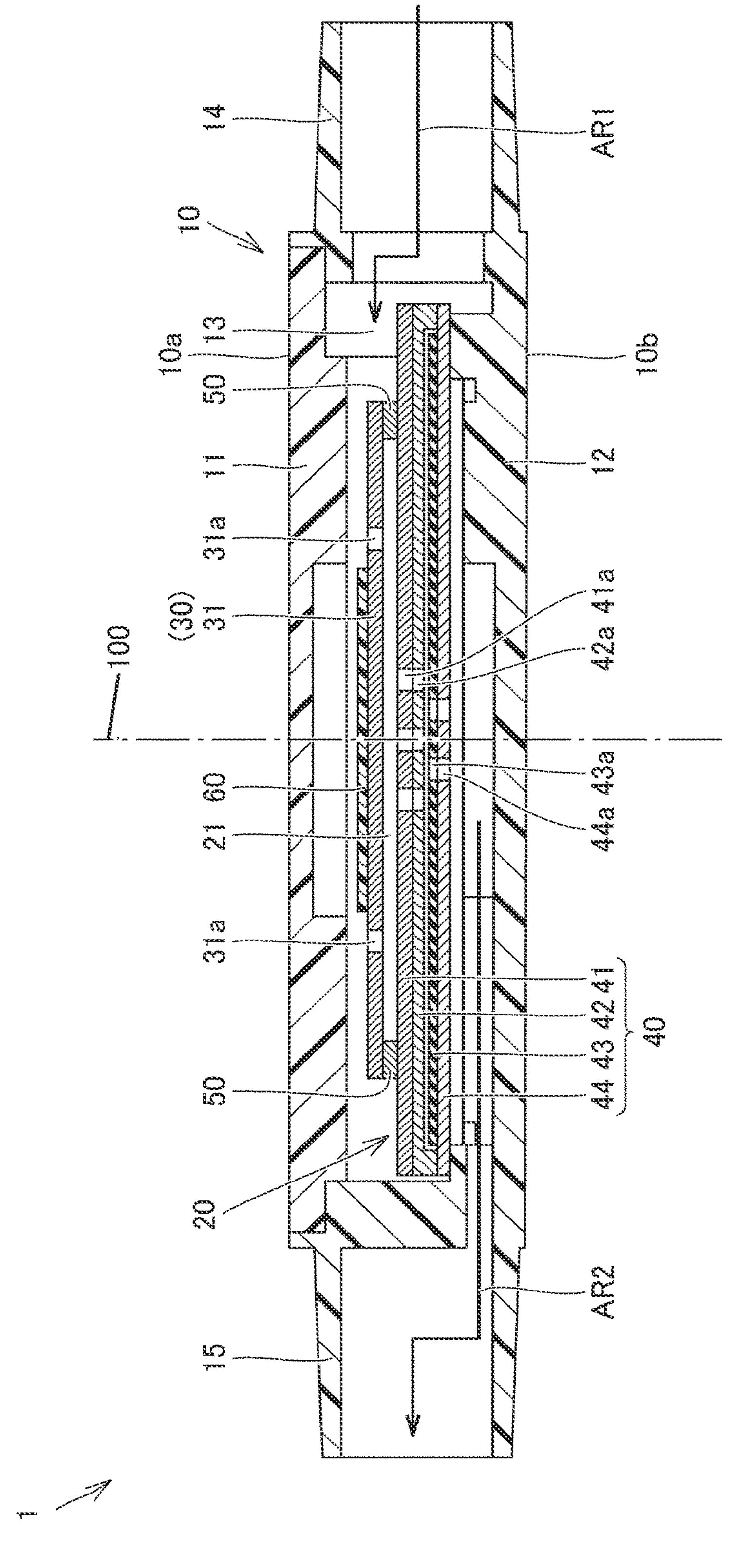
FIG. 2 is a sectional view of a piezoelectric pump provided in the nebulizer according to embodiment 1.
Figure 3:
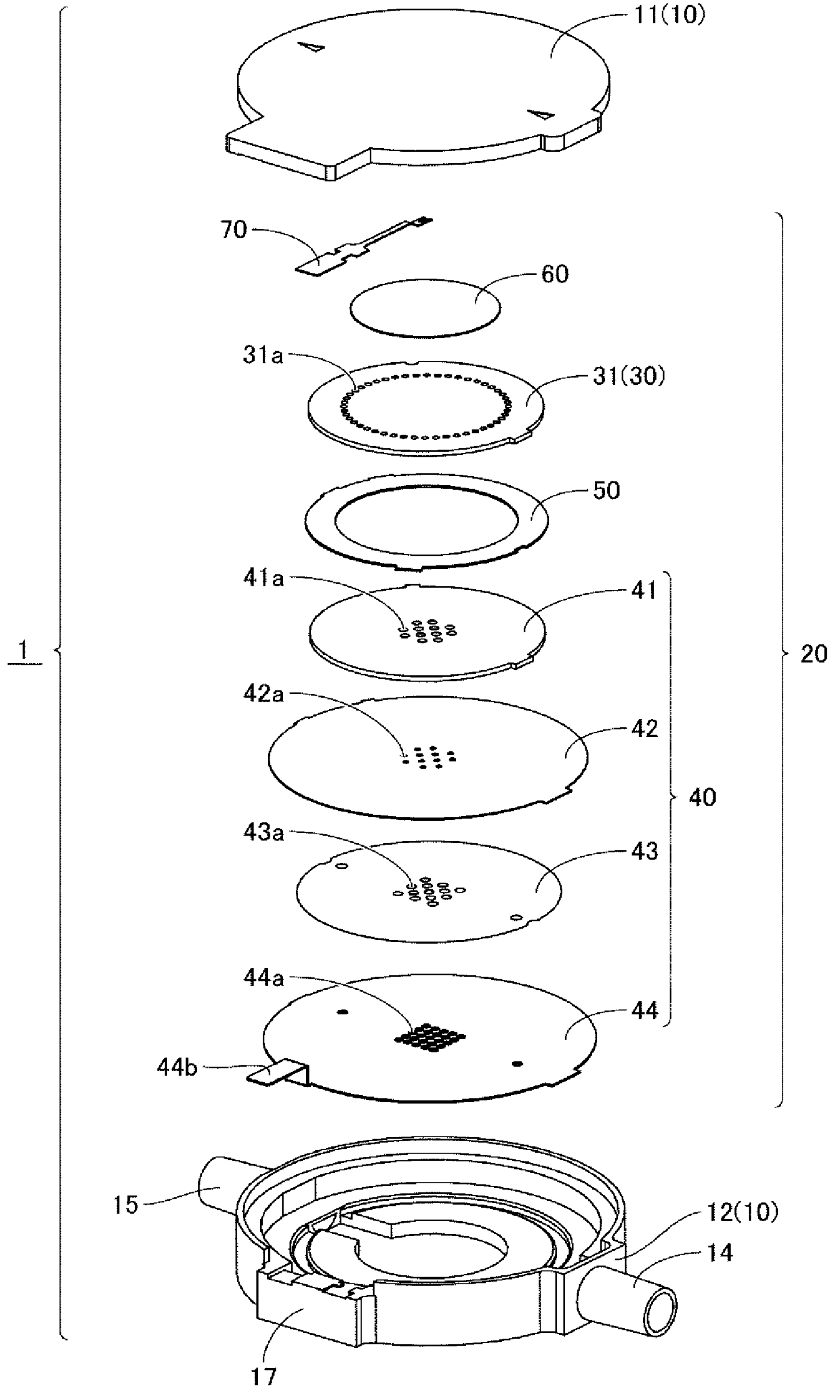
FIG. 3 is an exploded perspective view of the piezoelectric pump provided in the nebulizer according to embodiment 1.

FIGS. 2 and 3 are a sectional view and an exploded perspective view of the piezoelectric pump provided in the nebulizer according to embodiment 1. The piezoelectric pump 1 according to embodiment 1 will be described with reference to FIGS. 2 and 3.

As illustrated in FIGS. 2 and 3, the piezoelectric pump 1 according to the embodiment includes mainly a pump cabinet 10 as the pump cabinet and a driving portion 20. A housing space 13, which is a flat cylindrical space, is provided in the pump cabinet 10, and the driving portion 20 is disposed in the housing space 13.

The pump cabinet 10 includes a disk-shaped first cabinet 11 made of a resin or a metal and a second cabinet 12 like a flat-bottomed cylinder made of a resin or a metal. The first cabinet 11 and the second cabinet 12 are combined with each other and joined to each other with, for example, an adhesive to form the housing space 13 described above in the pump cabinet 10.

The pump cabinet 10 has the first main surface 10*a* and the second main surface 10*b* facing each other in the direction of an axis 100. It should be noted that the direction of the axis 100 is orthogonal to a first vibrating plate 31, which will be described later.

The first main surface 10*a* and the second main surface 10*b* are substantially orthogonal to the direction of the axis 100. The first main surface 10*a* and the second main surface 10*b* are disposed parallel to the main surface of the piezoelectric element 60, which will be described later, and face the main surface of the piezoelectric element 60.

The first main surface 10*a* is formed mainly of the outer surface of the first cabinet 11. The second main surface 10*b* is formed mainly of an outer surface part of the second cabinet 12 that faces the first cabinet 11.

In addition, the pump cabinet 10 has a side surface that connects the first main surface 10*a* and the second main surface 10*b* to each other. The side surface is formed of the outer peripheral surface of the second cabinet 12 concentric about the axial 100 direction.

The upstream nozzle portion 14 and the downstream nozzle portion 15 that project to the outside are provided at positions on the outer peripheral portions of the second cabinet 12 that correspond to each other. That is, the upstream nozzle portion 14 and the downstream nozzle portion 15 are provided on the side surface described above of the pump cabinet 10. The space outside the piezoelectric pump 1 and the housing space 13 described above communicate with each other through the upstream nozzle portion 14 and the downstream nozzle portion 15.

The driving portion 20 includes mainly the plate-like first vibrating body 30, the plate-like second vibrating body 40, the spacer 50 as a peripheral wall portion, and the piezoelectric element 60 as a driving body. The driving portion 20 is formed by stacking and integrating these members and is held by the pump cabinet 10 with the driving portion 20 disposed in the housing space 13 of the pump cabinet 10 described above. The first vibrating body 30 and the piezoelectric element 60 are stacked together to form the piezoelectric vibrator.

The housing space 13 of the pump cabinet 10 is partitioned by the driving portion 20 into a space (that is, a space communicating with the upstream nozzle portion 14 without intervening with a pump chamber 21, which will be described later) close to the first cabinet 11 and a space (that is, a space communicating with the downstream nozzle portion 15 without intervening with the pump chamber 21, which will be described later) close to the second cabinet 12.

The first vibrating body 30 is formed of the first vibrating plate 31. The first vibrating plate 31 is formed of a metal thin plate made of, for example, stainless steel and has a circular outer shape in plan view. A plurality of holes 31*a* are formed in an annular array in the intermediate portion of the first vibrating plate 31 excluding the central portion and the peripheral edge portion.

The second vibrating body 40 is formed as a multilayer body including a second vibrating plate 41, an auxiliary vibrating plate 42, a check valve 43, and a valve body retaining member 44. The second vibrating body 40 faces the first vibrating body 30 and, more specifically, is disposed closer to the second cabinet 12 than the first vibrating body 30. The second vibrating plate 41, the auxiliary vibrating plate 42, the check valve 43, and the valve body retaining member 44 are stacked together in this order as viewed from the first vibrating body 30.

The second vibrating plate 41 is formed of a metal thin plate made of, for example, stainless steel and has a circular outer shape in plan view. A plurality of holes 41*a* are provided in the central portion of the second vibrating plate 41 and the vicinity thereof.

The auxiliary vibrating plate 42 is formed of a metal thin plate made of, for example, stainless steel and is thinner than the second vibrating plate 41 and has a circular outer shape in plan view. The auxiliary vibrating plate 42 is a member for forming a space in which the check valve 43 is disposed, and an annular projection for forming this space is provided in the peripheral edge portion of the main surface of the auxiliary vibrating plate 42 located close to the second cabinet 12. The peripheral edge portion of the auxiliary vibrating plate 42 is joined to the peripheral edge portion of second vibrating plate 41 with, for example, a conductive adhesive. A plurality of holes 42*a* communicating with the plurality of holes 41*a* provided in the second vibrating plate 41 are provided in the central portion of the auxiliary vibrating plate 42 and the vicinity thereof.

The check valve 43 is formed of a thin plate made of a resin, such as a polyimide resin, and has a circular outer shape in plan view. The check valve 43 is disposed in the space (that is, the space surrounded by the annular projection of the auxiliary vibrating plate 42) defined by the auxiliary vibrating plate 42 described above. In the central portion of the check valve 43 and the vicinity thereof, a plurality of holes 43*a* that do not directly face but exist in proximity to the plurality of holes 42*a* are provided in the auxiliary vibrating plate 42.

The valve body retaining member 44 is formed of a metal thin plate made of, for example, stainless steel and has a circular outer shape in plan view. The valve body retaining member 44 is attached to the auxiliary vibrating plate 42 to cover the check valve 43 disposed in the space described above of the auxiliary vibrating plate 42. More specifically, the peripheral edge portion of the valve body retaining member 44 is joined to the annular projection of the auxiliary vibrating plate 42 with, for example, a conductive adhesive. A plurality of holes 44*a* communicating with the plurality of holes 43*a* provided in the check valve 43 are provided in the central portion of the valve body retaining member 44 and the vicinity thereof.

The check valve 43 is loosely fitted into the space between the auxiliary vibrating plate 42 and the valve body retaining member 44. As a result, the check valve 43 is movably held by the auxiliary vibrating plate 42 and the valve body retaining member 44 so as to open and close the plurality of holes 42*a* provided in the auxiliary vibrating plate 42. More specifically, the check valve 43 closes the plurality of holes 42*a* when the check valve 43 approaches and comes into close contact with the auxiliary vibrating plate 42 and opens the plurality of holes 42*a* when the check valve 43 is away from the auxiliary vibrating plate 42.

The spacer 50 is located between the first vibrating body 30 and the second vibrating body 40 and is clamped by the first vibrating body 30 and the second vibrating body 40. The spacer 50 is formed of a metal member made of, for example, stainless steel, and has an annular plate-like outer shape.

The spacer 50 connects the peripheral edge portion of the first vibrating body 30 and the peripheral edge portion of the second vibrating body 40 to each other. As a result, the first vibrating body 30 and the second vibrating body 40 are disposed at a predetermined distance with the spacer 50 therebetween. It should be noted that the spacer 50 and the first vibrating body 30 are joined to each other with, for example, a conductive adhesive and that the spacer 50 and the second vibrating body 40 are joined to each other with, for example, a conductive adhesive.

The space located between the first vibrating body 30 and the second vibrating body 40 functions as the pump chamber 21. The pump chamber 21 is defined by the first vibrating body 30, the second vibrating body 40, and the spacer 50, and formed as a flat cylindrical space. Here, the spacer 50 corresponds to the peripheral wall portion that defines the pump chamber 21 and connects the first vibrating body 30 and the second vibrating body 40 to each other.

The piezoelectric element 60 is pasted onto the first vibrator 30 with, for example, a conductive adhesive. More specifically, the piezoelectric element 60 is pasted onto the main surface (that is, the surface close to the first cabinet 11) opposite to the surface of the first vibrating body 30 that faces the pump chamber 21. The piezoelectric element 60 is formed of a thin plate made of a piezoelectric material, such as PZT, and has a circular outer shape in plan view.

Application of an AC voltage causes the bending vibration of the piezoelectric element 60, and the bending vibration of the piezoelectric element 60 propagates through the first vibrating body 30 and the second vibrating body 40, thereby causing the bending vibration of the first vibrating body 30 and the second vibrating body 40. That is, the piezoelectric element 60 corresponds to the driving body that causes the bending vibration of the first vibrating body 30 and the second vibrating body 40, and application of an AC voltage at a predetermined frequency vibrates the first vibrating body 30 and the second vibrating body 40 at resonant frequencies, thereby causing standing waves in both the first vibrating body 30 and the second vibrating body 40.

It should be noted that the peripheral edge portion of the valve body retaining member 44 is joined to the second cabinet 12 with, for example, an adhesive. Accordingly, the driving portion 20 including the first vibrating body 30, the second vibrating body 40, the spacer 50, the piezoelectric element 60, and the like is held inside the pump cabinet 10.

The driving portion 20 further includes a pair of external connection terminals as power supply lines for applying a voltage to the piezoelectric element 60 from the outside. The pair of external connection terminals includes a first terminal 70 formed as a member other than the first vibrating body 30, the second vibrating body 40, and the spacer 50, and a second terminal 44*b* provided in the valve body retaining member 44 included in the second vibrating body 40.

One end of the first terminal 70 is joined to the main surface of the piezoelectric element 60 close to the first cabinet 11 by, for example, soldering, and the other end thereof is drawn out so as to be exposed to the outside of the pump cabinet 10. On the other hand, the second terminal 44*b* is formed of a tongue-shaped portion extending to the outside from a predetermined position at the outer end of the valve body retaining member 44, and the end thereof is drawn out so as to be exposed to the outside of the pump cabinet 10.

The valve body retaining member 44 having the second terminal 44*b* is electrically conducted to the main surface of the piezoelectric element 60 close to the second cabinet 12 via a conductive adhesive or the like that joins the piezoelectric element 60 and the first vibrating plate 31 to each other, a conductive adhesive or the like that joins the first vibrating plate 31, the spacer 50, the second vibrating plate 41, the auxiliary vibrating plate 42, and these components to each other, and a conductive adhesive or the like that joints the valve body retaining member 44 and the auxiliary vibrating plate 42, and accordingly, the second terminal 44*b* functions as one of the pair of external connection terminals.

It should be noted that the other end of the first terminal 70 and the end of the second terminal 44*b* are drawn out onto a terminal block 17 provided at a predetermined position on the outer peripheral portion of the second cabinet 12, and accordingly, the other end and the end are exposed to the outside of the pump cabinet 10.

[Operation of the Piezoelectric Pump]

In the piezoelectric pump 1 according to the embodiment, the piezoelectric element 60 causes the bending vibration of the first vibrating body 30 and the second vibrating body 40 such that standing waves are generated in both the first vibrating body 30 and the second vibrating body 40 about the axis 100 orthogonal to the central portion of the first vibrating body 30 and the central portion of the second vibrating body 40.

At this time, the piezoelectric element 60 directly drives the first vibrating body 30 onto which the piezoelectric element 60 has been pasted and indirectly drives, via the spacer 50, the second vibrating body 40 onto which the piezoelectric element 60 has not been pasted. At this time, due to the shapes (especially the thicknesses of the vibrating plates) of the first vibrating body 30 and the second vibrating body 40 being appropriately designed, the first vibrating body 30 and the second vibrating body 40 are displaced in the directions opposite to each other.

The vibration of the first vibrating body 30 and the vibration of the second vibrating body 40 in the opposite directions cause the pump chamber 21 to repeat the expansion and contraction. This causes the resonance in the pump chamber 21, thereby causing large pressure fluctuations in the pump chamber 21. As a result, a positive pressure and a negative pressure are alternately generated in the pump chamber 21, and the pressure fluctuations achieve the pumping function that pneumatically feeds the gas. Accordingly, the gas is pneumatically fed as indicated by the arrows AR1 and AR2 in FIG. 2. External gas is sucked through the upstream nozzle portion 14, and the gas is discharged to the outside through the downstream nozzle portion 15.

[Operation of the Nebulizer]

Figure 4:
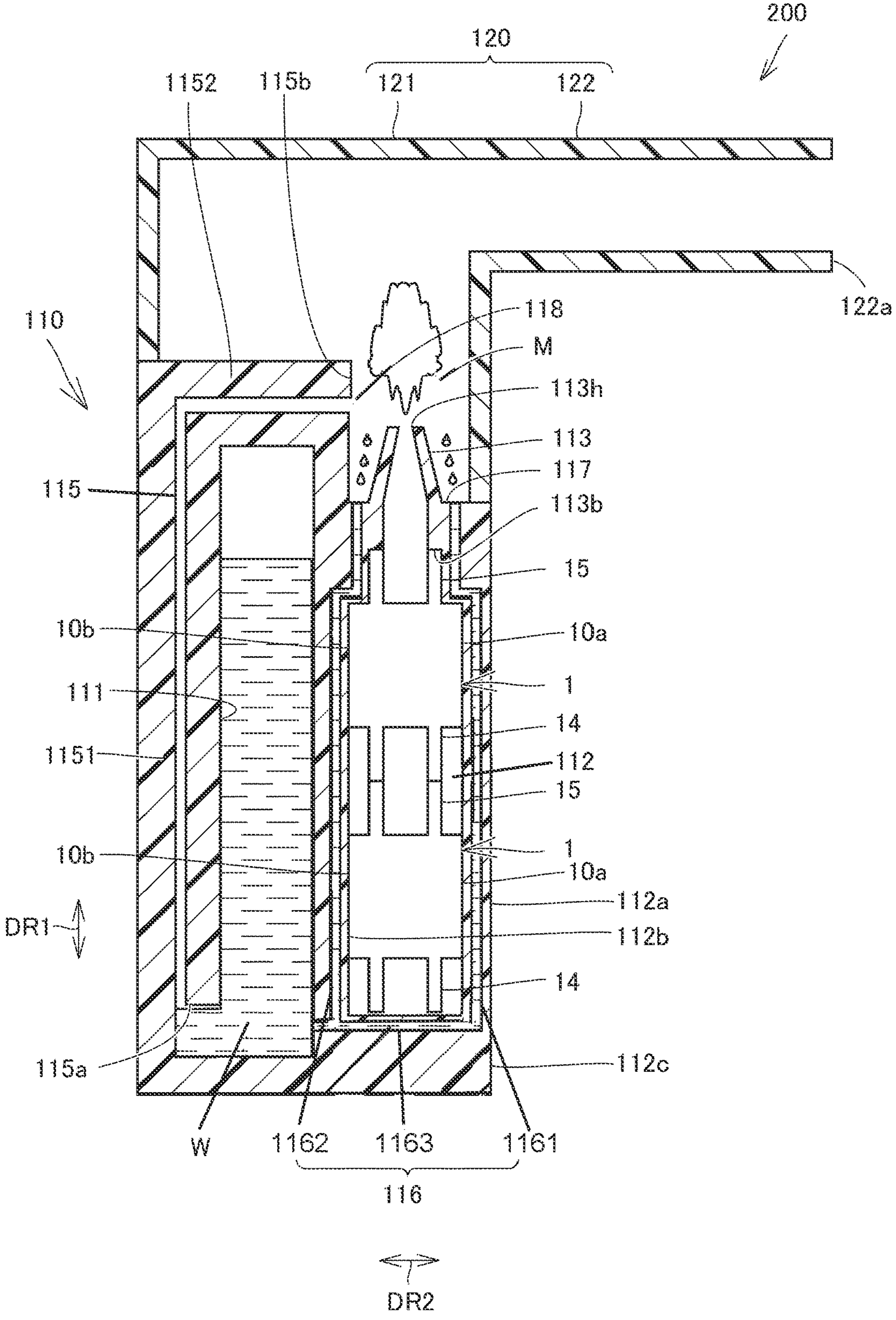
FIG. 4 is a schematic sectional view for describing the operation of the nebulizer according to embodiment 1.

FIG. 4 is a schematic sectional view for describing the operation of the nebulizer according to embodiment 1. The operation of the nebulizer will be described with reference to FIG. 4.

When the two piezoelectric pumps 1 described above are driven, air is sucked through the intake port provided in the case body 110. The air sucked through the intake port passes through the two piezoelectric pumps 1 and is introduced to the nozzle portion 113. The air introduced to the nozzle portion 113 is blown out toward the mixing portion M through the nozzle hole 113*h*. At this time, a negative pressure is generated in the vicinity of the conducting portion 118.

The negative pressure causes the liquid W to be sucked up from the liquid reservoir portion 111 to the conducting path 115. The sucked liquid W is gradually conducted from the conducting portion 118 (more specifically, the other end 115*b* of the conducting path 115) to the mixing portion M. The liquid conducted to the mixing portion M is pulverized by the collision with the ejected air and changed to atomized particles. An aerosol is generated from the atomized particles, and the generated aerosol is discharged through the discharge port 122*a* while being guided by the guide portion 122.

On the other hand, the residual liquid (the liquid having not been added in the mixing portion M to the gas ejected through the nozzle portion 113, and the liquid added to the gas but liquefied by the collision with the inner wall of the flow path forming body 120) that remains without being delivered to the outside of the device is stored in the liquid receiving portion 117. The residual liquid stored in the liquid receiving portion 117 is returned to the liquid reservoir portion 111 through the reflux path 116.

Here, when the piezoelectric element 60 is driven and the first vibrating body 30 and the second vibrating body 40 are vibrated to drive the piezoelectric pump 1, the piezoelectric element 60 generates heat and the temperature of the pump cabinet 10 rises.

At this time, since the reflux path 116 is provided so as to be in contact with at least a part of the pump cabinet 10 as described above, the pump cabinet 10 is cooled by the residual liquid flowing through the reflux path 116. This can suppress the piezoelectric pump 1 from operating abnormally due to heat generation.

Furthermore, since the reflux path 116 is provided so as to be in contact with both the first main surface 10*a* and the second main surface 10*b* of the piezoelectric pump 1, the piezoelectric pump 1 can be cooled more effectively.

It should be noted that the scenario in which the reflux path 116 is provided so as to be in contact with both the first main surface 10*a* and the second main surface 10*b* of the piezoelectric pump 1 is described in embodiment 1, but the present disclosure is not limited to this example, and the reflux path 116 may be provided so as to be in contact with at least one of the first main surface 10*a* and the second main surface 10*b* of piezoelectric pump 1. That is, at least one of the first channel 1161 and the second channel 1162 need only be provided.

In addition, the piezoelectric pump 1 can also be effectively cooled by cooling the first main surface 10*a* and/or the second main surface 10*b* of the piezoelectric pump 1 that faces the main surface of the piezoelectric element 60.

In addition, as described above, the upstream nozzle portion 14 and the downstream nozzle portion 15 are provided on the side surface of the pump cabinet 10, and the downstream nozzle portion 15 is connected to the base end 113*b* of the nozzle portion 113. That is, the nozzle portion 113 is disposed on the side surface of the pump cabinet 10. Accordingly, the reflux path 116 can be easily brought into contact with the first main surface 10*a* and/or the second main surface 10*b*, and accordingly, the piezoelectric pump 1 can be easily cooled. In addition, since the reflux path 116 can be easily brought into contact with the first main surface 10*a* and/or the second main surface 10*b*, it is possible to prevent the shape of the reflux path 116 from becoming complex and improve the degree of freedom in designing the reflux path 116.

Embodiment 2

Figure 5:
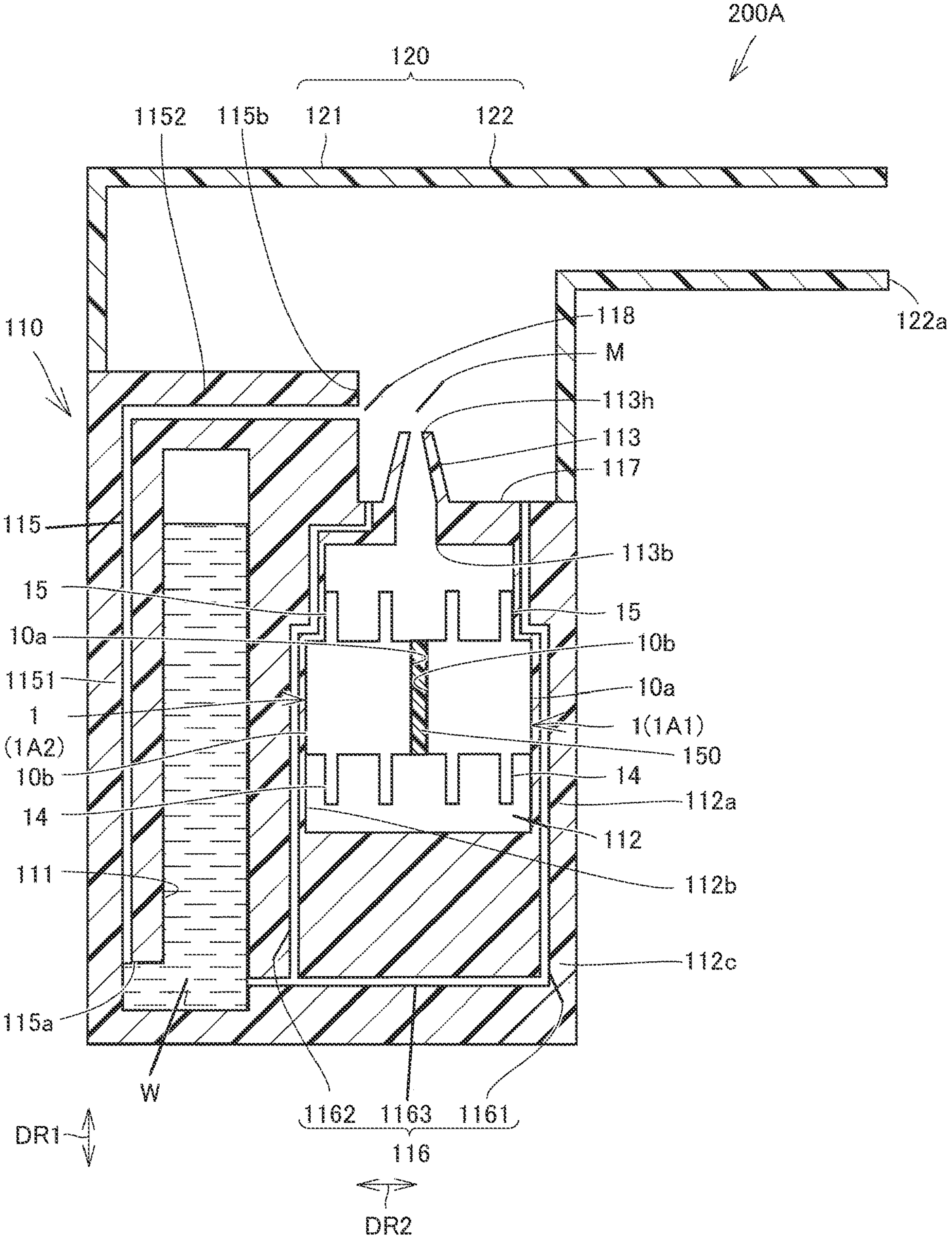
FIG. 5 is a schematic sectional view of a nebulizer according to embodiment 2.

FIG. 5 is a schematic sectional view of the nebulizer according to embodiment 2. A nebulizer 200A according to embodiment 2 will be described with reference to FIG. 5.

As illustrated in FIG. 5, the nebulizer 200A according to embodiment 2 differs from the nebulizer 200 according to embodiment 1 in the disposition of the piezoelectric pump 1. The other structure is substantially the same.

The two piezoelectric pumps 1 are arranged in the second direction (DR2 direction). A sealing member 150 is disposed in the gap between the two piezoelectric pumps 1 arranged in the second direction.

In this case as well, the reflux path 116 is provided so as to be in contact with at least a part of the pump cabinet 10 of the piezoelectric pump 1. Specifically, the first flow path 1161 is in contact with the first main surface 10*a* of the pump cabinet 10 of a piezoelectric pump 1A1 disposed on the other side in the second direction among the two piezoelectric pumps 1. The second flow path 1162 is in contact with the second main surface 10*b* of the pump cabinet 10 of a piezoelectric pump 1A2 disposed on one side in the second direction among the two piezoelectric pumps 1.

Even in this structure, the pump cabinet 10 is cooled by the residual liquid flowing through the reflux path 116. Accordingly, the nebulizer 200A according to embodiment 2 can also obtain substantially the same effect as in embodiment 1.

Embodiment 3

Figure 6:
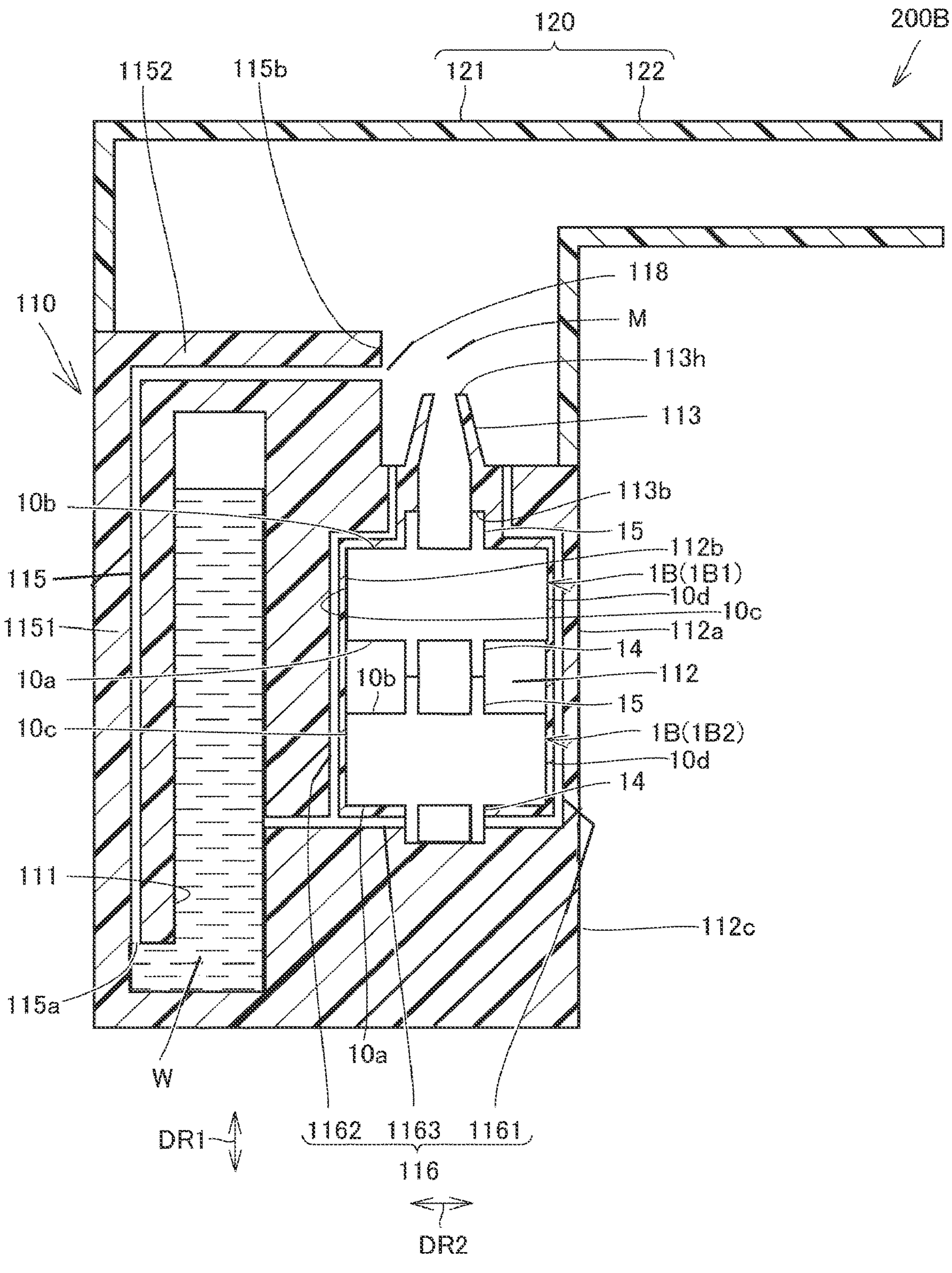
FIG. 6 is a schematic sectional view of a nebulizer according to embodiment 3.

FIG. 6 is a schematic sectional view of the nebulizer according to embodiment 3. A nebulizer 200B according to embodiment 3 will be described with reference to FIG. 6.

As illustrated in FIG. 6, the nebulizer 200B according to embodiment 3 differs from the nebulizer 200 according to embodiment 1 in mainly the structure of a piezoelectric pump 1B. The other structure is substantially the same.

In the piezoelectric pump 1B, the pump cabinet 10B has the first main surface 10*a* and the second main surface 10*b* that face each other in the axial direction of the nozzle portion 113. In addition, the pump cabinet 10B has a peripheral surface portion that connects the peripheral edges of the first main surface 10*a* and the second main surface 10*b* to each other. The peripheral surface portion includes a one-side peripheral surface portion 10*c* located on one side in the second direction and an other-side peripheral surface portion 10*d* disposed on the other side in the second direction.

The piezoelectric pump 1B is disposed in the pump housing chamber 112 such that the second main surface 10*b* faces one side (up side) in the first direction and the first main surface 10*a* faces the other side (down side) in the first direction. The two piezoelectric pumps 1B include piezoelectric pumps 1B1 and 1B2, and the piezoelectric pump 1B1 is disposed on one side in the first direction of the piezoelectric pump 1B2.

Figure 7:
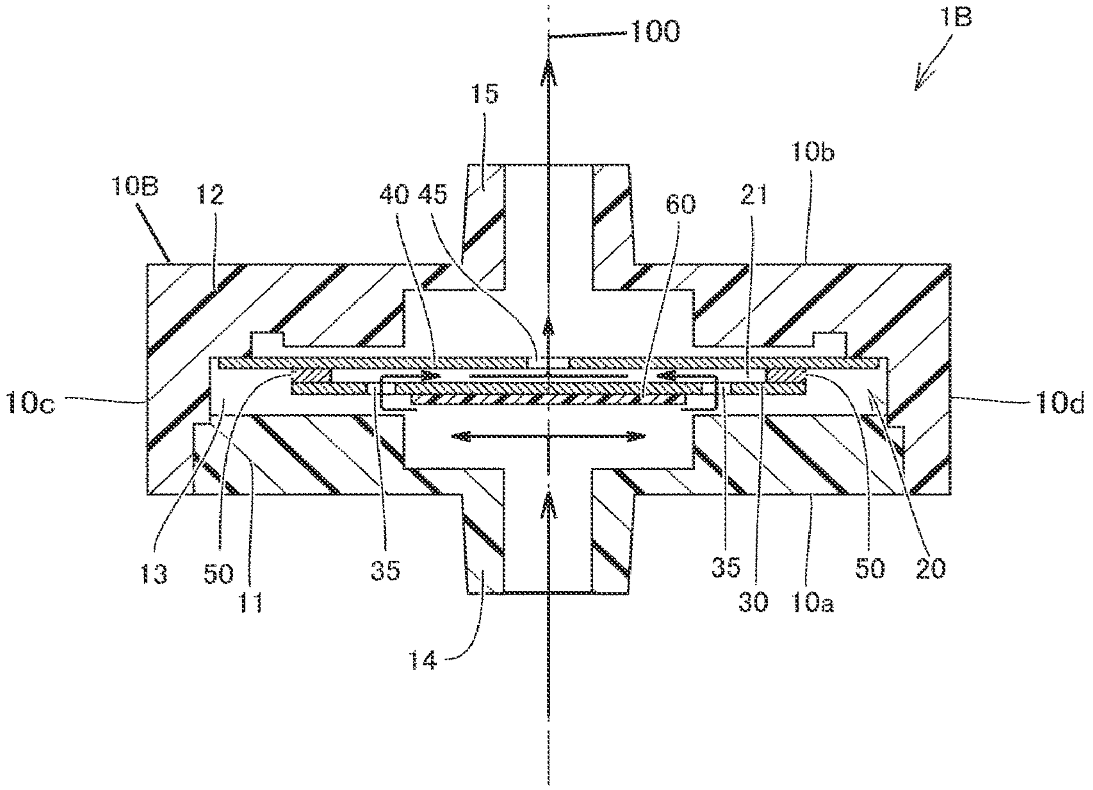
FIG. 7 is a sectional view of a piezoelectric pump provided in the nebulizer according to embodiment 3.

FIG. 7 is a sectional view of the piezoelectric pump of the nebulizer according to embodiment 3. As illustrated in FIG. 7, the pump cabinet 10 of the piezoelectric pump 1B has the first cabinet 11 and the second cabinet 12, and the first cabinet 11 has the upstream nozzle portion 14 so as to project to the outside from the central portion thereof, and the second cabinet 12 has the downstream nozzle portion 15 so as to project to the outside from the central portion thereof.

The upstream nozzle portion 14 and the downstream nozzle portion 15 are disposed to overlap the driving portion 20 in a direction parallel to the direction of the axis 100. It should be noted that, since the structure of the driving portion 20 is the same as that of embodiment 1, the description thereof is omitted.

Even in this structure, air flows as indicated by the arrows in FIG. 7 because of driving by the driving portion 20.

[Reflux Path]

As illustrated in FIG. 6 again, in this case as well, the reflux path 116 is provided so as to be in contact with at least a part of the pump cabinet 10 of the piezoelectric pump 1.

Specifically, the first flow path 1161 is provided along the other side in the second direction of the second main surface 10*b* of the piezoelectric pump 1B1, the other-side peripheral surface portion 10*d* of the piezoelectric pump 1B1, and the other-side peripheral surface portion 10*d* of the piezoelectric pump 1B2. The second flow path 1162 is provided along one side in the second direction of the second main surface 10*b* of the piezoelectric pump 1B1, the one-side peripheral surface portion 10*c* of the piezoelectric pump 1B1, and the one-side peripheral surface portion 10*c* of the piezoelectric pump 1B2. The third flow path 1163 is provided along the first main surface 10*a* of the piezoelectric pump 1B2.

Even in this structure, the pump cabinet 10B is cooled by the residual liquid flowing through the reflux path 116. Furthermore, since the contact area of the reflux path 116 in contact with the pump cabinet 10B in embodiment 3 is greater than that in embodiment 1, the nebulizer 200B according to embodiment 3 can cool the pump cabinet 10B more effectively than the nebulizer 200 according to embodiment 1.

Embodiment 4

Figure 8:
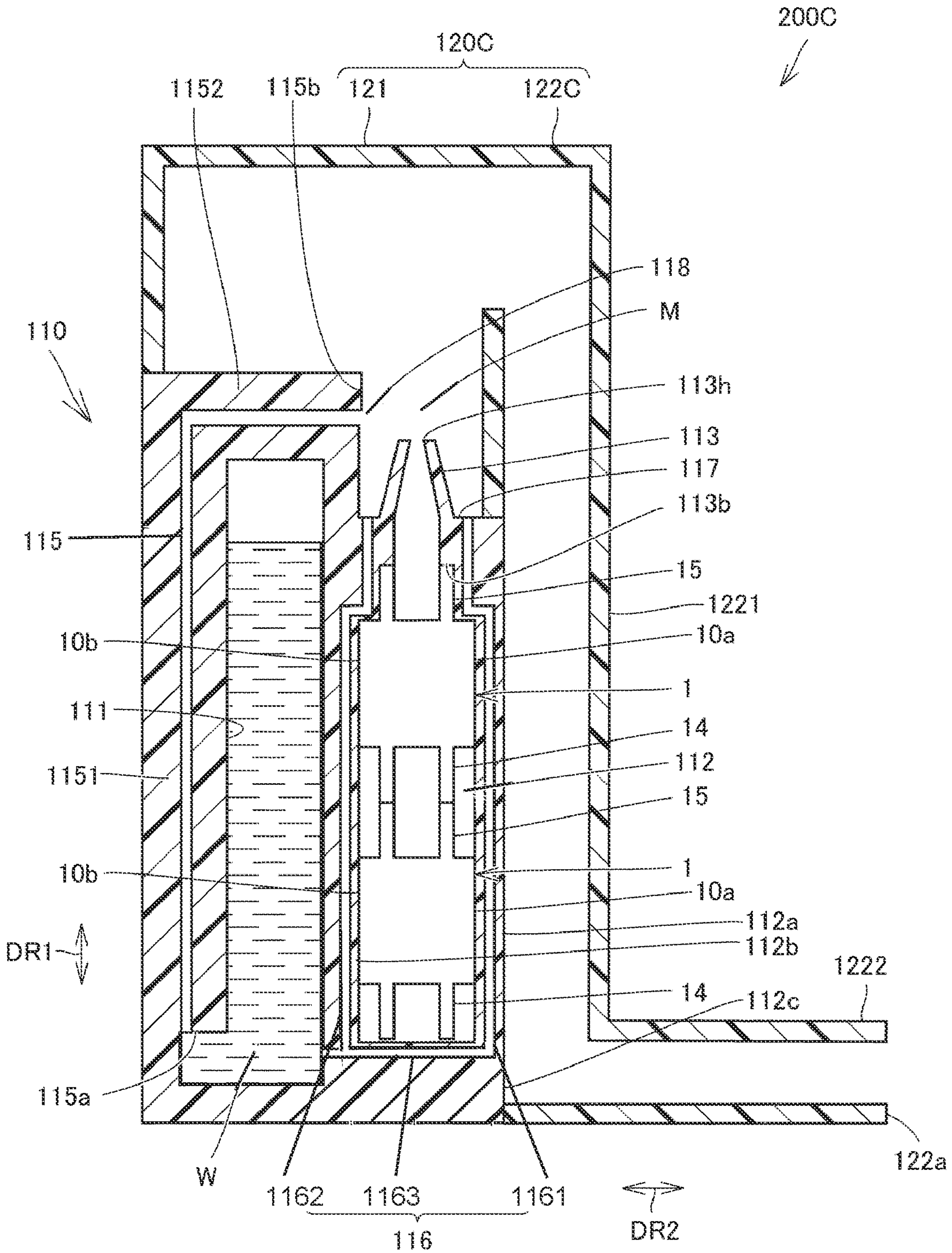
FIG. 8 is a schematic sectional view of a nebulizer according to embodiment 4.

FIG. 8 is a schematic sectional view of a nebulizer according to embodiment 4. A nebulizer 200C according to embodiment 4 will be described with reference to FIG. 8.

As illustrated in FIG. 8, the nebulizer 200C according to embodiment 4 differs from the nebulizer 200 according to embodiment 1 in the structure of a flow path forming body 120C. The other structure is substantially the same.

In the nebulizer 200C according to embodiment 4, a part of the flow path through which a mixed fluid flows is formed of a guide portion 122C of the flow path forming body 120C and a wall portion that forms a part of the outer surface of the case body 110.

Specifically, the first wall portion 112*a* described above forms a part of the outer surface of the case body 110 while forming the first flow path 1161 that is a part of the reflux path 116.

The guide portion 122C includes a first portion 1221 along the first wall portion 112*a* and a second portion 1222 that is connected to the first portion 1221 and extends away from the first wall 112*a*. The first portion 1221 is disposed to face the first wall portion 112*a* and forms a part of the flow path together with the first wall portion 112*a*.

In this case as well, since the pump cabinet 10 is cooled by the residual liquid flowing through the reflux path 116, substantially the same effect as in embodiment 1 can be obtained.

In addition, since the first wall portion 112*a* can be cooled by the mixed fluid flowing through the flow path, the pump cabinet 10 can be further cooled via the first wall portion 112*a*.

(Other Modifications)

The scenario in which the liquid W is conducted from the conducting portion 118 to the mixing portion M due to a negative pressure generated by the gas ejected through the nozzle portion 113 is described as an example in the embodiment described above, but the present disclosure is not limited to this example, and the liquid W may be conducted to the mixing portion M by separately providing a pump for circulating the liquid W and driving this pump. In addition, the piezoelectric pump 1 may have a first pump chamber in which the liquid W flows and a second pump chamber in which the gas flows. In this case, the conducting path 115 is provided so as to pass through the first pump chamber.

In addition, the scenario in which the mixed-fluid delivery device is a nebulizer is described as an example in the embodiment described above, but the present disclosure is not limited to this example, and the mixed-fluid delivery device can also be applied to an aroma diffuser or a humidifier. When the mixed-fluid delivery device is a humidifier, the liquid stored in the liquid reservoir portion may be vaporized by heating or ultrasonic vibration, and the vaporized liquid may be conducted from the conducting portion 118 to the mixing portion M. In this case, the vaporized liquid is mixed with the gas ejected through the nozzle portion 113, and a mixed fluid is formed in the mixing portion M.

The scenario in which the conducting portion 118 includes the conducting path 115 is described as an example in the embodiment described above, but the present disclosure is not limited to this example, and the conducting portion 118 need not include the conducting path 115 as long as the liquid can be conducted to the mixing portion M.

As described above, the embodiments of the present disclosure are examples in all respects and do not restrict the present disclosure. The scope of the present disclosure is indicated by the claims and includes all changes within the meaning and the scope of equivalents of the claims.

1, 1A1, 1A2, 1B, 1B1, 1B2 piezoelectric pump
10, 10B pump cabinet
10*a* first main surface

10*b* second main surface
10*c* one-side peripheral surface portion
10*d* another-side peripheral surface portion
11 first cabinet
12 second cabinet
13 housing space
14 upstream nozzle portion
15 downstream nozzle portion
17 terminal block
20 driving portion
21 pump chamber
30 first vibrating body
31 first vibrating plate
31*a* hole
40 second vibrating body
41 second vibrating plate
41*a* hole
42 auxiliary vibrating plate
42*a* hole
43 check valve
43*a* hole
44 valve body retaining member
44*a* hole
44*b* second terminal
50 spacer
60 piezoelectric element
70 first terminal
100 axis
110 case body
111 liquid reservoir portion
112 pump housing chamber
112*a* first wall portion
112*b* second wall portion
112*c* bottom wall portion
113 nozzle portion
113*b* base end
113*h* nozzle hole
115 conducting path
115*a* one end
115*b* another end
116 reflux path
117 liquid receiving portion
118 conducting portion
120, 120C flow path forming body
121 cap portion
122, 122C guide portion
122*a* discharge port
150 sealing member
200, 200A, 200B, 200C nebulizer
1151 first portion
1152 second portion
1161 first flow path
1162 second flow path
1163 third flow path
1221 first portion
1222 second portion

The invention claimed is:

1. A mixed-fluid delivery device configured to generate a mixed fluid by mixing an ejected gas with a liquid and deliver the mixed fluid to an outside, the mixed-fluid delivery device comprising:

a piezoelectric pump including a piezoelectric vibrator and a pump cabinet, the piezoelectric vibrator including a piezoelectric element and a vibrating plate, the pump cabinet having the piezoelectric vibrator therein, and the piezoelectric pump being configured to discharge the gas; and a case body including a pump housing chamber, a liquid reservoir portion, a mixing portion, a nozzle portion and a conducting portion, the pump housing chamber housing the piezoelectric pump, the liquid reservoir portion being configured to store the liquid, the mixing portion being configured to generate the mixed fluid, the nozzle portion being configured to eject the gas discharged from the piezoelectric pump to the mixing portion, and the conducting portion being configured to conduct the liquid toward the mixing portion, wherein the case body has a reflux path through which a residual liquid remaining in the mixing portion without being delivered to the outside is returned to the liquid reservoir portion, and the reflux path is provided so as to be in contact with at least a part of the pump cabinet.

2. The mixed-fluid delivery device according to claim 1, wherein the pump cabinet has a first main surface and a second main surface each facing a main surface of the piezoelectric element, and a part of the reflux path is in contact with at least one of the first main surface and the second main surface.

3. The mixed-fluid delivery device according to claim 2, wherein the pump cabinet includes a side surface connecting the first main surface and the second main surface to each other, and the nozzle portion is disposed on the side surface.

4. The mixed-fluid delivery device according to claim 1, wherein the case body has, around the nozzle portion, a liquid receiving portion configured to receive the residual liquid, and the reflux path is provided to connect the liquid receiving portion and the liquid reservoir portion to each other.

5. The mixed-fluid delivery device according to claim 1, further comprising:

a flow path forming body fixed to the case body and forming a flow path through which the mixed fluid flows, wherein the case body includes a wall portion constituting a part of the reflux path and forming an outer surface of the case body, and the flow path forming body forms at least a part of the wall portion and a part of the flow path.

6. The mixed-fluid delivery device according to claim 2, wherein the case body has, around the nozzle portion, a liquid receiving portion configured to receive the residual liquid, and the reflux path is provided to connect the liquid receiving portion and the liquid reservoir portion to each other.

7. The mixed-fluid delivery device according to claim 3, wherein the case body has, around the nozzle portion, a liquid receiving portion configured to receive the residual liquid, and the reflux path is provided to connect the liquid receiving portion and the liquid reservoir portion to each other.

8. The mixed-fluid delivery device according to claim 2, further comprising:

a flow path forming body fixed to the case body and forming a flow path through which the mixed fluid flows, wherein the case body includes a wall portion constituting said part or another part of the reflux path and forming an outer surface of the case body, and the flow path forming body forms at least a part of the wall portion and a part of the flow path.

9. The mixed-fluid delivery device according to claim 3, further comprising:

a flow path forming body fixed to the case body and forming a flow path through which the mixed fluid flows, wherein the case body includes a wall portion constituting said part or another part of the reflux path and forming an outer surface of the case body, and the flow path forming body forms at least a part of the wall portion and a part of the flow path.

10. The mixed-fluid delivery device according to claim 4, further comprising:

a flow path forming body fixed to the case body and forming a flow path through which the mixed fluid flows, wherein the case body includes a wall portion constituting a part of the reflux path and forming an outer surface of the case body, and the flow path forming body forms at least a part of the wall portion and a part of the flow path.

* * * * *